(12) United States Patent
Park et al.

(10) Patent No.: US 11,170,936 B2
(45) Date of Patent: Nov. 9, 2021

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Yong Park, Suwon-si (KR); Sim Chung Kang, Suwon-si (KR); Woo Chul Shin, Suwon-si (KR); Jong Ho Lee, Suwon-si (KR); Ki Pyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 16/572,105

(22) Filed: Sep. 16, 2019

(65) Prior Publication Data

US 2021/0005382 A1 Jan. 7, 2021

(30) Foreign Application Priority Data

Jul. 1, 2019 (KR) ........................ 10-2019-0078902

(51) Int. Cl.
*H01G 4/30* (2006.01)
*H01G 4/12* (2006.01)
*H01G 4/012* (2006.01)
*H01G 4/232* (2006.01)

(52) U.S. Cl.
CPC ........... *H01G 4/1227* (2013.01); *H01G 4/012* (2013.01); *H01G 4/30* (2013.01); *H01G 4/232* (2013.01)

(58) Field of Classification Search
CPC ........ H01G 4/1227; H01G 4/012; H01G 4/30; H01G 4/232
See application file for complete search history.

(56) References Cited

U.S. PATENT DOCUMENTS

| | | | |
|---|---|---|---|
| 10,373,762 B2 * | 8/2019 | Hong | ........................ H01G 4/30 |
| 10,490,352 B2 * | 11/2019 | Kato | ........................ H01G 4/005 |
| 2012/0250221 A1 | 10/2012 | Yamashita | |
| 2014/0301012 A1 * | 10/2014 | Kim | ..................... H01G 4/1209 |
| | | | 361/301.4 |

(Continued)

FOREIGN PATENT DOCUMENTS

| | | |
|---|---|---|
| JP | 2014-204116 A | 10/2014 |
| JP | 2017-147358 A | 8/2017 |

(Continued)

*Primary Examiner* — Dion Ferguson
(74) *Attorney, Agent, or Firm* — Morgan, Lewis & Bockius LLP

(57) ABSTRACT

A multilayer ceramic capacitor includes a ceramic body including a dielectric layer, a plurality of internal electrodes disposed in the ceramic body, and a first side margin portion and a second side margin portion respectively arranged on end portions of the internal electrodes exposed from first and second surfaces. The first and second side margin portions respectively include a first region adjacent to an outer side surface of each of the side margin portions, and a second region adjacent to the internal electrodes exposed from the first and second surfaces. The number of pores per unit area in the second region is less than the number of pores per unit area in the first region.

8 Claims, 10 Drawing Sheets

(56) References Cited

U.S. PATENT DOCUMENTS

| | | | |
|---|---|---|---|
| 2014/0301015 A1 | 10/2014 | Kim | |
| 2015/0340155 A1* | 11/2015 | Fukunaga | H01G 4/012 |
| | | | 361/301.4 |
| 2017/0018363 A1* | 1/2017 | Tanaka | H01G 4/232 |
| 2017/0243697 A1* | 8/2017 | Mizuno | H01G 4/232 |
| 2018/0182555 A1* | 6/2018 | Kowase | H01G 4/224 |
| 2018/0261390 A1* | 9/2018 | Sakate | H01G 4/1227 |
| 2019/0348222 A1* | 11/2019 | Kato | H01G 4/1227 |
| 2019/0385794 A1* | 12/2019 | Yanagisawa | H01G 4/1245 |

FOREIGN PATENT DOCUMENTS

| | | |
|---|---|---|
| KR | 10-2010-0136917 A | 12/2010 |
| KR | 10-2012-0080657 A | 7/2012 |

\* cited by examiner (a)

(b)

MULTILAYER CERAMIC CAPACITOR AND METHOD OF MANUFACTURING THE SAME

CROSS-REFERENCE TO RELATED APPLICATION

This application claims benefit of priority to Korean Patent Application No. 10-2019-0078902 filed on Jul. 1, 2019 in the Korean Intellectual Property Office, the disclosure of which is incorporated herein by reference in its entirety.

TECHNICAL FIELD

The present disclosure relates to a multilayer ceramic capacitor capable of improving reliability, and a method of manufacturing the same.

BACKGROUND

In general, an electronic component using a ceramic material such as a capacitor, an inductor, a piezoelectric element, a varistor, a thermistor, or the like, may include a ceramic body made of a ceramic material, an internal electrode formed in the body, and an external electrode provided on an surface of the ceramic body to be connected to the internal electrode.

In recent years, miniaturization and multifunctionality of electronic products have led to the tendency for miniaturization and high functionality in chip components. Therefore, a multilayer ceramic capacitor may be required to be a small-sized, high-capacitance product.

In order to make the multilayer ceramic capacitor small in size and high in capacitance, it may be required to maximize an effective area of the electrode (increase the effective volume fraction required for capacitance).

As above, in order to realize a small-sized, high-capacitance multilayer ceramic capacitor, in manufacturing the multilayer ceramic capacitor as described above, there may be applied a method in which the internal electrodes may be exposed in the width direction of the body to maximize an area of the internal electrodes in the width direction through a design without a margin, and, after preparing the chip, a side margin portion may be separately attached to the exposed surface of the internal electrode in the width direction of the chip in a pre-sintering operation.

However, in the case of the above method, in the operation of forming the side margin portion, a large amount of pores may be generated at the interface in which the ceramic body and the side margin portion are in contact with each other, to deteriorate reliability.

In addition, due to the pores, deterioration in reliability for moisture resistance may be caused by a decrease in sintering compactness of the outer portion.

Therefore, there is a need for research that may prevent deterioration in reliability for moisture resistance in ultra-small and high-capacitance products.

SUMMARY

An aspect of the present disclosure is to provide a multilayer ceramic capacitor capable of improving reliability, and a method of manufacturing the same.

According to an aspect of the present disclosure, a multilayer ceramic capacitor includes a ceramic body including a dielectric layer, and including a first surface and a second surface opposing each other, a third surface and a fourth surface connected to the first surface and the second surface and opposing each other, and a fifth surface and a sixth surface connected to the first surface to the fourth surface and opposing each other; a plurality of internal electrodes disposed in the ceramic body, exposed from the first and second surfaces, and having one ends exposed from the third surface or the fourth surface; and a first side margin portion and a second side margin portion respectively arranged on end portions of the internal electrodes exposed from the first and second surfaces. The ceramic body comprises an active portion comprising the plurality of internal electrodes arranged to oppose each other with the dielectric layer interposed therebetween to form capacitance, and cover portions respectively disposed on upper and lower surfaces of the active portion, and the first and second side margin portions respectively include a first region adjacent to an outer side surface of each of the side margin portions, and a second region adjacent to the internal electrodes exposed from the first and second surfaces. The number of pores per unit area in the second region is less than the number of pores per unit area in the first region.

According to another aspect of the present disclosure, a method of manufacturing a multilayer ceramic capacitor, includes: preparing a first ceramic green sheet having a plurality of first internal electrode patterns formed at predetermined intervals, and a second ceramic green sheet having a plurality of second internal electrode patterns formed at predetermined intervals; forming a ceramic green sheet stacked body by stacking the first ceramic green sheet and the second ceramic green sheet to alternately arrange the first internal electrode patterns and the second internal electrode patterns in a thickness direction; cutting the ceramic green sheet stacked body to have ends of the first internal electrode patterns and the second internal electrode patterns having exposed side surfaces in a width direction; forming a first side margin portion and a second side margin portion on the exposed side surfaces of the ends of the first internal electrode patterns and the second internal electrode patterns, to prepare a cut stacked body; and sintering the cut stacked body to prepare a ceramic body comprising a dielectric layer and first and second internal electrodes. The ceramic body comprises an active portion comprising the plurality of internal electrodes arranged to oppose each other with the dielectric layer interposed therebetween to form capacitance, and cover portions respectively formed on upper and lower surfaces of the active portion, and the first and second side margin portions respectively include a first region adjacent to an outer side surface of each of the side margin portions, and a second region adjacent to the exposed internal electrodes. The number of pores per unit area in the second region is less than the number of pores per unit area in the first region.

According to another aspect of the present disclosure, a multilayer ceramic capacitor includes: a ceramic body including a dielectric layer, and including a first surface and a second surface opposing each other, a third surface and a fourth surface connected to the first surface and the second surface and opposing each other, and a fifth surface and a sixth surface connected to the first surface to the fourth surface and opposing each other; a plurality of internal electrodes disposed in the ceramic body, exposed from the first and second surfaces, and having one ends exposed from the third surface or the fourth surface; and a first side margin portion and a second side margin portion respectively arranged on end portions of the internal electrodes exposed from the first and second surfaces. The ceramic body comprises an active portion comprising the plurality of internal electrodes arranged to oppose each other with the dielectric layer interposed therebetween to form capacitance, and cover portions respectively disposed on upper and lower surfaces of the active portion, and each of the cover portions includes a first region adjacent to the fifth surface or the sixth surface of the ceramic body, and a second region adjacent to the active portion. The number of pores per unit area in the second region of each of the cover portions is less than the number of pores per unit area in the first region of each of the cover portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
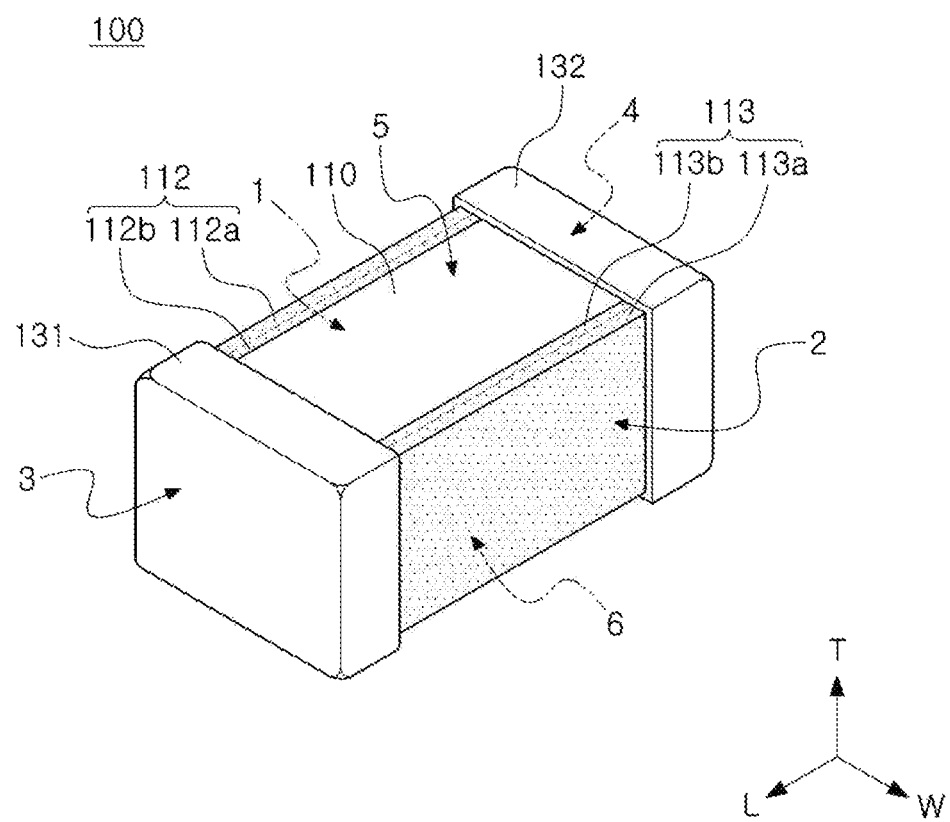
FIG. 1 is a schematic perspective view illustrating a multilayer ceramic capacitor according to an embodiment of the present disclosure.

Hereinafter, preferred embodiments of the present disclosure will be described with reference to the accompanying drawings. Embodiments of the present disclosure may be modified into various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

FIG. 1 is a schematic perspective view illustrating a multilayer ceramic capacitor according to an embodiment of the present disclosure.

Figure 2:
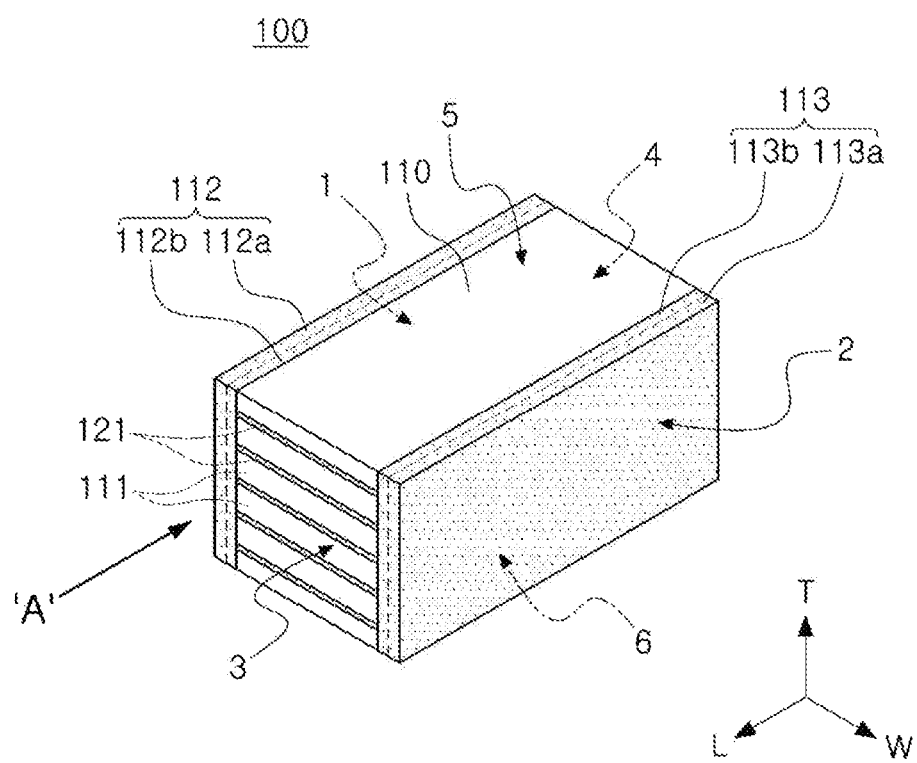
FIG. 2 is a perspective view illustrating an appearance of the ceramic body of FIG. 1.

FIG. 2 is a perspective view illustrating an appearance of the ceramic body of FIG. 1.

Figure 3:
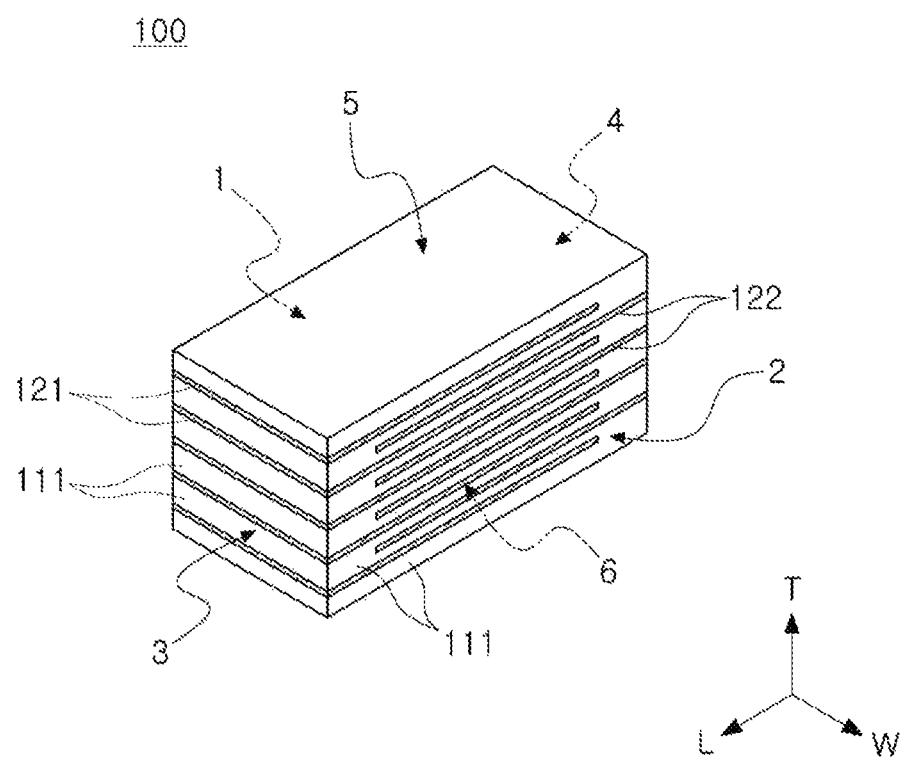
FIG. 3 is a perspective view illustrating a ceramic green sheet stacked body of the ceramic body of FIG. 2, prior to a sintering operation.

FIG. 3 is a perspective view illustrating a ceramic green sheet stacked body of the ceramic body of FIG. 2, prior to a sintering operation.

Figure 4:
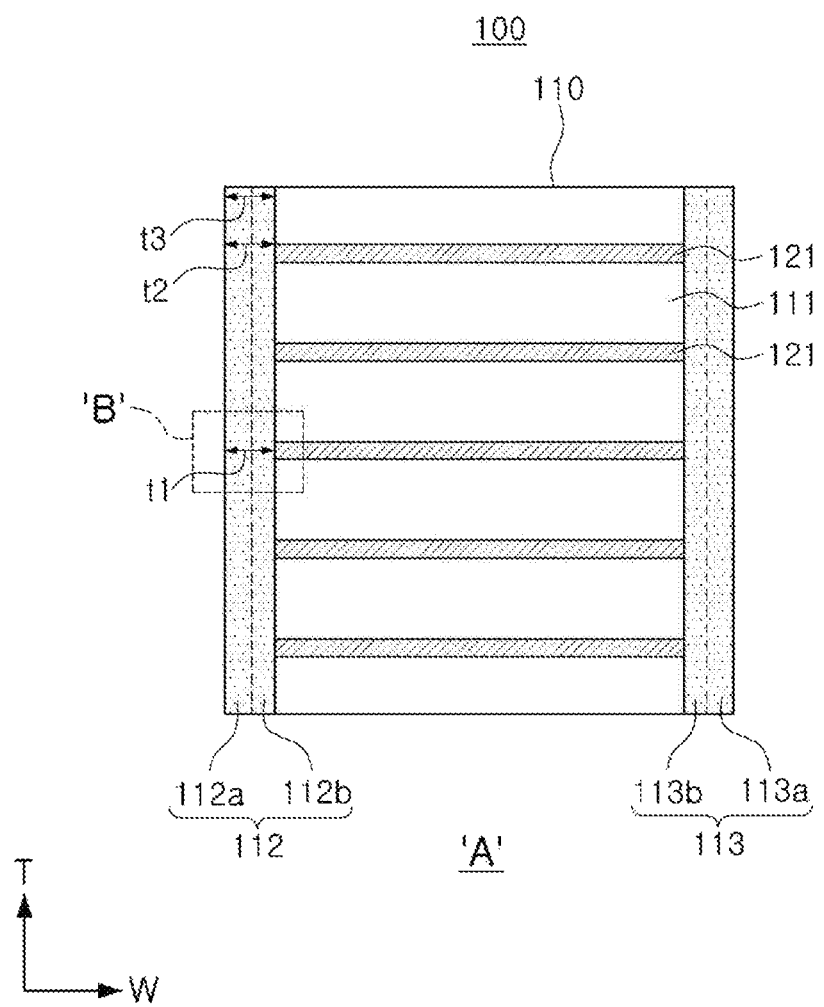
FIG. 4 is a side view of FIG. 2, when viewed in direction A.

FIG. 4 is a side view of FIG. 2, when viewed in direction A.

Referring to FIGS. 1 to 4, a multilayer ceramic capacitor 100 according to this embodiment may include a ceramic body 110, a plurality of internal electrodes 121 and 122 formed in the ceramic body 110, and external electrodes 131 and 132 formed on an external surface of the ceramic body 110.

The ceramic body 110 may have a first surface 1 and a second surface 2, opposing each other, a third surface 3 and a fourth surface 4, connecting the first surface 1 and the second surface 2, and a fifth surface 5 and a sixth surface 6, which are an upper surface and a lower surface of the ceramic body 110.

The first surface 1 and the second surface 2 may be defined as surfaces opposing each other in a width direction of the ceramic body 110, the third surface 3 and the fourth surface 4 may be defined as surfaces opposing each other in a longitudinal direction, and the fifth surface 5 and the sixth surface 6 may be defined as surfaces opposing each other in a thickness direction.

A shape of the ceramic body 110 is not particularly limited, but may be a rectangular parallelepiped shape as illustrated in the drawings.

The plurality of internal electrodes 121 and 122 formed in the ceramic body 110 may have one end exposed from the third surface 3 or the fourth surface 4 of the ceramic body.

The internal electrodes 121 and 122 may have a first internal electrode 121 and a second internal electrode 122, having different polarities, in pairs.

One end of the first internal electrode 121 may be exposed from the third surface 3, and one end of the second internal electrode 122 may be exposed from the fourth surface 4.

The other ends of the first internal electrode 121 and the second internal electrode 122 may be formed to be spaced apart from the third surface 3 or the fourth surface 4 at regular intervals.

A first external electrode 131 may be formed on the third surface 3 of the ceramic body to be electrically connected to the first internal electrode 121. A second external electrode 132 may be formed on the fourth surface 4 of the ceramic body to be electrically connected to the second internal electrode 122.

A multilayer ceramic capacitor 100 according to an embodiment of the present disclosure may include a plurality of internal electrodes 121 and 122 disposed in the ceramic body 110, exposed from the first and second surfaces 1 and 2, and having one end exposed from the third surface 3 or the fourth surface 4; and a first side margin portion 112 and a second side margin portion 113 respectively arranged on end portions of the internal electrodes 121 and 122 exposed from the first and second surfaces 1 and 2.

The plurality of internal electrodes 121 and 122 may be formed in the ceramic body 110. End of each of the plurality of internal electrodes 121 and 122 may be exposed from the first and second surfaces 1 and 2, which are surfaces in the width direction of the ceramic body 110, and the first side margin portion 112 and the second side margin portion 113 may be arranged on the exposed end portions, respectively.

An average thickness of each of the first side margin portion 112 and the second side margin portion 113 may be 2 μm or more and 15 μm or less.

According to an embodiment of the present disclosure, the ceramic body 110 may include a stacked body in which a plurality of dielectric layers 111 are stacked, and a first side margin portion 112 and a second side margin portion 113 respectively arranged on both side surfaces of the stacked body.

The plurality of dielectric layers 111 may be in a sintered state, and boundaries between neighboring dielectric layers may be unified to a degree not capable of being confirmed.

A length of the ceramic body 110 may correspond to a distance from the third surface 3 to the fourth surface 4 of the ceramic body.

A length of the dielectric layer 111 may form a space between the third surface 3 and the fourth surface 4 of the ceramic body.

According to an embodiment of the present disclosure, the length of the ceramic body may be 400 to 1400 µm. In particular, the length of the ceramic body may be 400 to 800 µm, or 600 to 1400 µm.

The internal electrodes 121 and 122 may be formed on the dielectric layer 111, and the internal electrodes 121 and 122 may be formed in the ceramic body 110 with a single dielectric layer interposed therebetween by a sintering process.

Referring to FIG. 3, the first internal electrode 121 may be formed on the dielectric layer 111. The first internal electrode 121 may be not formed entirely in the longitudinal direction of the dielectric layer. For example, one end of the first internal electrode 121 may be formed at a predetermined interval from the fourth surface 4 of the ceramic body, and the other end of the first internal electrode 121 may be formed up to the third surface 3 and exposed from the third surface 3.

End portion of the first internal electrode exposed from the third surface 3 of the ceramic body may be connected to the first external electrode 131.

In a different manner to the first internal electrode, one end of the second internal electrode 122 may be formed at a predetermined interval from the third surface 3, and the other end of the second internal electrode 122 may be exposed from the fourth surface 4 and connected to the second external electrode 132.

The internal electrodes may be stacked by 400 layers or more for implementation of a high-capacitance multilayer ceramic capacitor, but are not limited thereto.

The dielectric layer 111 may have a width equal to a width of the first internal electrode 121. For example, the first internal electrode 121 may be formed overall in the width direction of the dielectric layer 111.

According to an embodiment of the present disclosure, the width of the dielectric layer and the width of the internal electrode may be 100 to 900 µm, but are not limited thereto. In particular, the width of the dielectric layer and the width of the internal electrode may be 100 to 500 µm, or 100 to 900 µm.

As the ceramic body is miniaturized, the thickness of the side margin portion may affect the electrical characteristics of the multilayer ceramic capacitor. According to an embodiment of the present disclosure, the thickness of the side margin portion may be formed to be 15 µm or less, to improve the characteristics of the miniaturized multilayer ceramic capacitor.

For example, since the side margin portion 112/113 may have a thickness of 15 µm or less, a high-capacitance and a small-sized multilayer ceramic capacitor may be realized by maximally ensuring overlapping region of the internal electrodes forming the capacitance.

The ceramic body 110 may include an active portion serving as a portion contributing to capacitance formation of the capacitor, and upper and lower cover portions respectively formed on upper and lower surfaces of the active portion, as upper and lower margin portions.

The active portion may be formed by repeatedly stacking the plurality of first and second internal electrodes 121 and 122 with the dielectric layer 111 interposed therebetween.

The upper and lower cover portions may have the same material and configuration as the dielectric layer 111, except that they do not include internal electrodes.

For example, the upper and lower cover portions may include a ceramic material, for example, a barium titanate ($BaTiO_3$)-based ceramic material.

Each of the upper and lower cover portions may have a thickness of 20 µm or less, but is not limited thereto.

In an embodiment of the present disclosure, the internal electrode and the dielectric layer may be simultaneously cut off, and the width of the internal electrode and the width of the dielectric layer may be formed to be the same. More specific details thereof will be described later.

The width of the dielectric layer may be formed to be equal to the width of the internal electrode. Therefore, the ends of the internal electrodes 121 and 122 may be exposed from the first and second surfaces 1 and 2 of the ceramic body 110 in the width direction.

The first side margin portion 112 and the second side margin portion 113 may be respectively formed on both side surfaces of the ceramic body 110 from which the ends of the internal electrodes 121 and 122 are exposed.

The thickness of each of the first side margin portion 112 and the second side margin portion 113 may be 15 µm or less. The smaller the thickness of each of the first side margin portion 112 and the second side margin portion 113, the larger the overlapping region of the internal electrodes formed in the ceramic body.

The thicknesses of the first side-margin portion 112 and the second side-margin portion 113 are not particularly limited as long as they have a thickness that may prevent short-circuiting of the internal electrode exposed from the side surface of the ceramic body 110. For example, the thickness of each of the first side margin portion 112 and the second side margin portion 113 may be 2 µm or more.

When the thickness of each of the first and second side margin portions is less than 2 µm, the mechanical strength against external impact may be lowered. When the thickness of each of the first and second side margin portions exceeds 15 µm, the overlapping region of the internal electrodes may be relatively reduced, and it may be difficult to secure a high-capacitance of the multilayer ceramic capacitor.

In order to maximize the capacitance of the multilayer ceramic capacitor, a method of thinning the dielectric layer, a method of stacking a thinned dielectric layer in a relatively high dense, a method of improving coverage of internal electrode, and the like, have been considered.

Further, a method of improving overlapping region of internal electrodes forming capacitance has been considered.

In order to increase the overlapping region of the internal electrodes, a region of a margin portion in which the internal electrodes are not formed should be minimized.

Particularly, in order to increase the overlapping region of the internal electrodes, as the multilayer ceramic capacitor is miniaturized, the region of the margin portion should be minimized.

According to this embodiment, it may be characterized in that the internal electrode is formed on the entirety of the dielectric layer in the width direction, the thickness of the side margin portion is set to 15 µm or less, and the overlapping region of the internal electrodes is relatively large.

Generally, the thickness of each of the dielectric layer and the internal electrode becomes thinner, as the dielectric layers are stacked in a relatively high dense. Therefore, a phenomenon that the internal electrode is short-circuited may occur frequently. In addition, when the internal electrodes are formed only in a portion of the dielectric layer, a step difference due to the internal electrodes may occur to deteriorate acceleration life span and reliability in the insulation resistance.

According to this embodiment, even when internal electrodes and a dielectric layer of a thin film are formed, since the internal electrodes may be entirely formed on the dielectric layer in the width direction, the overlapping region of the internal electrodes becomes large, and the capacitance of the multilayer ceramic capacitor may increase.

In addition, it is possible to provide a multilayer ceramic capacitor having improved reliability and excellent capacitance characteristics by reducing the step difference due to the internal electrode to improve the acceleration life span in insulation resistance.

Figure 5:
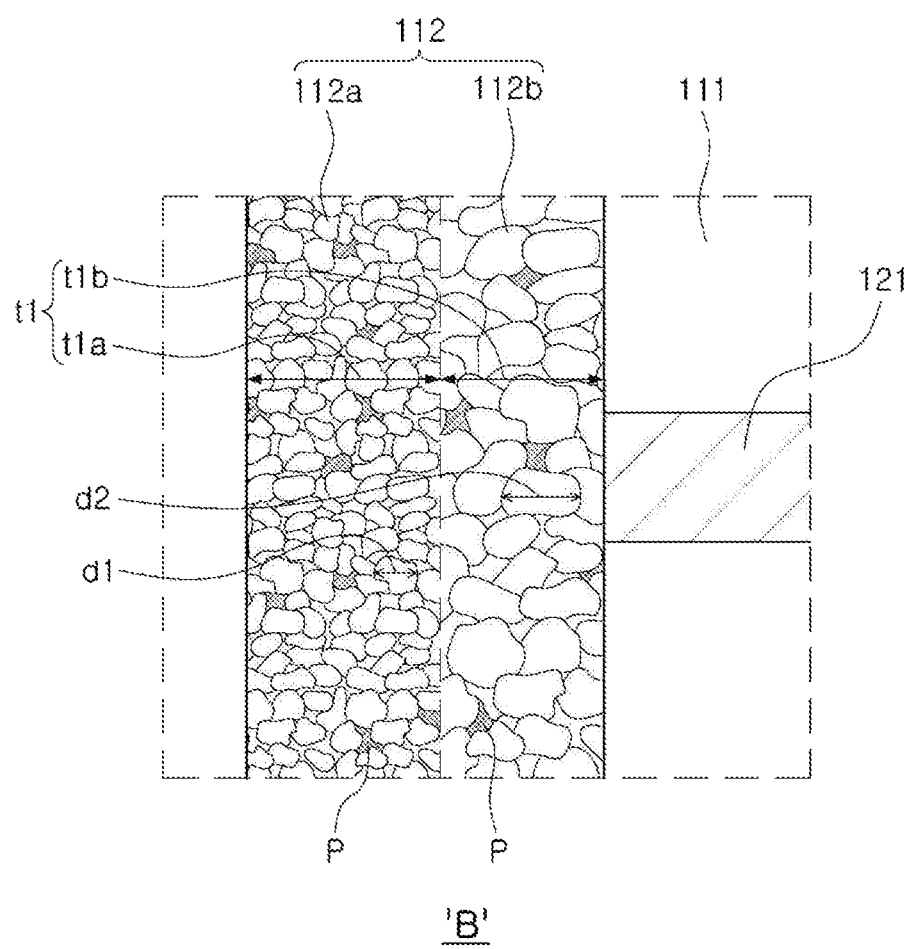
FIG. 5 is an enlarged view of region B of FIG. 4.

FIG. 5 is an enlarged view of region B of FIG. 4.

Referring to FIG. 5, the first and second side margin portions 112 and 113 may respectively include first regions 112a and 113a adjacent to outer side surfaces of the side margin portions 112 and 113, and second regions 112b and 113b adjacent to the internal electrodes 121 and 122 exposed from the first and second surfaces 1 and 2 of the ceramic body 110. The number of pores (P) per unit area in the second regions 112b and 113b is less than the number of pores (P) per unit area in the first regions 112a and 113a. In one example, unit area may refer to unit area in a cross-section in a width-thickness plane.

The first and second side margin portions 112 and 113 arranged on the side surface of the ceramic body 110 may include two regions having different sizes of dielectric grain. The number of pores (P) per unit area in the second regions 112b and 113b may be adjusted to be less than the number of pores (P) per unit area in the first regions 112a and 113a, to improve the reliability for moisture resistance.

A size (d1) of the dielectric grain included in the first regions 112a and 113a may be adjusted to be smaller than a size (d2) of the dielectric grain included in the second regions 112b and 113b, to form a high-toughness gap sheet, and to improve a mounting crack. In one example, an average size of the dielectric grains included in the first regions 112a and 113a may be adjusted to be smaller than an average size of the dielectric grains included in the second regions 112b and 113b.

Generally, in an operation of forming the side margin portion, a large amount of pores may be generated at an interface in which the ceramic body and the side margin portions are in contact with each other, to deteriorate the reliability.

Further, due to the pores generated at the interface in which the ceramic body and the side margin portions are in contact with each other, deterioration in reliability for moisture resistance may be caused by a decrease in sintering compactness of the outer portion.

According to an embodiment of the present disclosure, the number of pores (P) per unit area in the second regions 112b and 113b of the side margin portions adjacent to the internal electrodes 121 and 122 exposed from the first surface 1 and the second surface 2 of the ceramic body 110, may be adjusted to be less than the number of pores (P) per unit area in the first regions 112a and 113a adjacent to the outer side surfaces of the first and second side margin portions 112 and 113, to improve the reliability for moisture resistance.

According to an embodiment of the present disclosure, a ratio of the number of pores per unit area in the second regions 112b and 113b to the number of pores per unit area in the first regions 112a and 113a may be 0.8 or less.

The ratio of the number of pores per unit area in the second regions 112b and 113b to the number of pores per unit area in the first regions 112a and 113a may be 0.8 or less, to improve the reliability for moisture resistance.

When the ratio of the number of pores per unit area in the second regions 112b and 113b to the number of pores per unit area in the first regions 112a and 113a exceeds 0.8, there may be no difference in the number of pores per unit area in the first regions 112a and 113a and the second regions 112b and 113b, to have little effect for improving the reliability for moisture resistance.

A method of adjusting the number of pores (P) per unit area in the second regions 112b and 113b of the side margin portions adjacent to the internal electrodes 121 and 122 exposed from the first surface 1 and the second surface 2 of the ceramic body 110 to be less than the number of pores (P) per unit area in the first regions 112a and 113a adjacent to the outer side surfaces of the first and second side margin portions 112 and 113, is not particularly limited. For example, the method may be realized by adjusting a size of a raw ceramic powder particle to be introduced in an operation of forming the first regions 112a and 113a and the second regions 112b and 113b.

For example, the method may be realized by adjusting a particle size of a barium titanate ($BaTiO_3$) powder particle as a raw material for forming the second regions 112b and 113b of the side margin portions adjacent to the internal electrodes 121 and 122 to be larger than a particle size of barium titanate ($BaTiO_3$) powder particle as a raw material for forming the first regions 112a and 113a adjacent to the outer side surfaces of the first and second side margin portions 112 and 113.

Although not particularly limited, for example, the particle size of a barium titanate ($BaTiO_3$) powder particle as a raw material for forming the second regions 112b and 113b of the side margin portions adjacent to the internal electrodes 121 and 122 may be about 70 nm, and the particle size of barium titanate ($BaTiO_3$) powder particle as a raw material for forming the first regions 112a and 113a adjacent to the outer side surfaces of the first and second side margin portions 112 and 113 may be about 40 nm. In one example, an average particle size of a barium titanate ($BaTiO_3$) powder particles as a raw material for forming the second regions 112b and 113b of the side margin portions adjacent to the internal electrodes 121 and 122 may be about 70 nm, and an average particle size of barium titanate ($BaTiO_3$) powder particles as a raw material for forming the first regions 112a and 113a adjacent to the outer side surfaces of the first and second side margin portions 112 and 113 may be about 40 nm.

According to an embodiment of the present disclosure, a size of the raw ceramic powder particle to be introduced in the operations of forming the first regions 112a and 113a and the second regions 112b and 113b may be controlled. Therefore, after the sintering operation, the size (d1) of the dielectric grain included in the first regions 112a and 113a may be 90 nm or more and 410 nm or less, and the size (d2) of the dielectric grain included in the second regions 112b and 113b may be 170 nm or more and 700 nm or less. In one example, after the sintering operation, an average size of the dielectric grains included in the first regions 112a and 113a may be 90 nm or more and 410 nm or less, and an average size of the dielectric grains included in the second regions 112b and 113b may be 170 nm or more and 700 nm or less.

The sizes of the dielectric grain included in the first regions 112a and 113a and the second regions 112b and 113b may be obtained by measuring lengths in major axis and minor axis of the dielectric grains extracted from the respective regions to calculate an average size thereof.

When shapes of the dielectric grains are assumed to be an ellipse, the length in major axis of the dielectric grains may correspond to a particle size of the dielectric grains at points having the longest distance, among various points measured as a size of the dielectric grains, and the length in minor axis of the dielectric grains may correspond to a particle size of the dielectric grains at points having the shortest distance, among various points measured as a size of the dielectric grains.

According to an embodiment of the present disclosure, the first and second side margin portions 112 and 113 respectively disposed on the side surfaces of the ceramic body 110 may respectively include two regions having different compositions, and a content of magnesium (Mg) respectively included in the first and second side marginal portions 112 and 113 may be made different, to improve the compactness of the first and second side margin portions 112 and 113, and improve the moisture resistance.

In particular, the content of magnesium (Mg) of the second regions 112b and 113b of the first and second side margin portions 112 and 113 may be greater than the content of magnesium (Mg) of the first regions 112a and 113a of the first and second side margin portions 112 and 113. Therefore, the compactness of the second regions 112b and 113b of the first and second side margin portions 112 and 113 may be enhanced to improve moisture resistance.

Particularly, the content of magnesium (Mg) of the first regions 112a and 113a of the first and second side margin portions 112 and 113, adjacent to the outer side surfaces of the first and second side margin portions 112 and 113, may be reduced to improve the defect of the mounting crack.

A method of adjusting the content of magnesium (Mg) included in the second regions 112b and 113b to be larger than the content of magnesium (Mg) included in the first regions 112a and 113a may be performed by differing dielectric compositions for forming the first and second side margin portions from each other in the first region and the second region, in a process of manufacturing a multilayer ceramic capacitor 100.

For example, in the dielectric compositions for forming the first and second side margin portions, the content of magnesium (Mg) included in the dielectric composition for forming the second region may increase to adjust the content of magnesium (Mg) included in the second regions 112b and 113b to be larger than the content of magnesium (Mg) included in the first regions 112a and 113a.

Therefore, the compactness of the second regions 112b and 113b of the margin portions 112 and 113 may be enhanced to improve the moisture resistance, may alleviate the electric field concentrated in internal electrode end portions, and may prevent breakdown of insulation, which may be one of the major defects of the multilayer ceramic capacitor, to improve the reliability of the multilayer ceramic capacitor.

According to an embodiment of the present disclosure, the content of magnesium (Mg) included in the second regions 112b and 113b may be 10 mol or more and 30 mol or less, based on 100 mol of titanium (Ti) included in the first and second side margin portions.

The content of magnesium (Mg) included in the second regions 112b and 113b may be controlled to be 10 mol or more and 30 mol or less, based on 100 mol of titanium (Ti) included in the first and second side margin portions, to increase breakdown voltage (BDV), and to improve the moisture resistance.

When the content of magnesium (Mg) included in the second regions 112b and 113b is less than 10 mol, based on 100 mol of titanium (Ti) included in the first and second side margin portions, formation of the oxide layer in the pores generated at the interface in which the ceramic body and the side margin portion are in contact with each other may be not sufficient, to increase breakdown voltage (BDV), and to increase the short failure.

When the content of magnesium (Mg) included in the second regions 112b and 113b exceeds 30 mol, based on 100 mol of titanium (Ti) included in the first and second side margin portions, the sintering characteristic may be deteriorated to cause problems of deteriorating the reliability.

According to an embodiment of the present disclosure, a very small multilayer ceramic capacitor may be characterized in that a thickness of the dielectric layer 111 is 0.4 µm or less, and a thickness of each of the internal electrodes 121 and 122 may be 0.4 µm or less.

As in an embodiment of the present disclosure, when a thin film in which a thickness of the dielectric layer 111 is 0.4 µm or less and a thickness of each of the internal electrodes 121 and 122 is 0.4 µm or less is applied, the reliability due to the pores generated at the interface in which the ceramic body and the side margin portions are in contact with each other may be a very important issue.

For example, in the case of the conventional multilayer ceramic capacitor, there may be no great problem in reliability even when the size of the dielectric grain of each of the side margin portions included in the multilayer ceramic capacitor according to an embodiment of the present disclosure is not adjusted.

In a product to which the dielectric layer and the internal electrode of the thin film are applied, as in an embodiment of the present disclosure, the number of pores included in the regions of each of the side margin portions can be controlled, to prevent the BDV and the reliability from being lowered due to the pore generated at an interface in which the ceramic body and the side margin portions are in contact with each other.

For example, in an embodiment of the present disclosure, the number of pores (P) per unit area included in the second regions 112b and 113b may be adjusted to be less than the number of pores (P) per unit area in the first regions 112a and 113a, to improve the reliability for moisture resistance, in a case of a thin film that the thickness of the dielectric layer 111 and the first and second internal electrodes 121 and 122 are 0.4 µm or less.

In this case, it can be understood as a concept that the thin film does not mean that the thickness of the dielectric layer 111 and the first and second internal electrodes 121 and 122 are 0.4 µm or less, and includes the dielectric layer and the internal electrode thinner than the conventional product.

A thickness (t1a) of the first regions 112a and 113a may be 12 µm or less, and a thickness (t1b) of the second regions 112b and 113b may be 3 µm or less, but are not limited thereto.

Referring to FIG. 4, a ratio of a thickness (t2) of a region of the first or second side margin portion contacting an end of an internal electrode disposed at an outermost periphery, relative to a thickness (t1) of a region of the first or second side margin portion contacting an end of an internal electrode disposed in a central portion, among the plurality of internal electrodes 121 and 122, may be 1.0 or less.

A lower limit of the ratio of the thickness (t2) of the region of the first or second side margin portion contacting the end of an internal electrode disposed at the outermost periphery, relative to the thickness (t1) of the region of the first or second side margin portion contacting the end of an internal electrode disposed in the central portion is not particularly restricted, but is preferably 0.9 or more.

According to an embodiment of the present disclosure, since the first or second side margin portion may be formed by attaching a ceramic green sheet to the side surface of the ceramic body, unlike the conventional art, the thickness of the first side margin portion or the second side margin portion may be maintained to be constant, regardless of a position.

For example, in the conventional art, since the side margin portion may be formed by applying or printing a ceramic slurry, the thickness of the side margin portion may vary greatly, depending on a position.

In particular, in the conventional case, a thickness of the first or second side margin region contacting an end of the internal electrode disposed in a central portion of the ceramic body may be formed to be thicker than a thickness of the other region.

For example, in the conventional case, a ratio of a thickness of a region of the first or second side margin portion contacting an end of an internal electrode disposed at an outermost periphery, relative to a thickness of a region of the first or second side margin portion contacting an end of an internal electrode disposed in a central portion may be less than 0.9, and may have a relatively wide deviation.

In the conventional case in which the side marginal portion has such a relatively wide deviation, depending on a position, since a portion occupied by the side margin portion may be relatively large in a multilayer ceramic capacitor having the same size, a size of a capacitance forming portion may not be secured sufficiently to ensure a relatively high-capacitance.

In an embodiment of the present disclosure, since an average thickness of the first and second side margin portions 112 and 113 may be 2 μm or more and 10 μm or less, and the ratio of the thickness (t2) of the region of the first or second side margin portion contacting the end of an internal electrode disposed at the outermost periphery, relative to the thickness (t1) of the region of the first or second side margin portion contacting the end of an internal electrode disposed in the central portion, among the plurality of internal electrodes 121 and 122, may be 0.9 or more and 1.0 or less, a thickness of the side margin portion may be relatively thin, and deviation in thickness may be relatively small, to secure a relatively large size of the capacitance forming portion.

As a result, a high-capacitance multilayer ceramic capacitor may be realized.

Referring to FIG. 4, a ratio of a thickness (t3) of a region of the first or second side margin portion contacting an edge of the ceramic body 110, relative to the thickness (t1) of the region of the first or second side margin portion contacting the end of the internal electrode disposed in the central portion, among the plurality of internal electrodes 121 and 122, may be 1.0 or less.

A lower limit of the ratio of the thickness (t3) of the region of the first or second side margin portion contacting the edge of the ceramic body 110, relative to the thickness (t1) of the region of the first or second side margin portion contacting the end of an internal electrode disposed in the central portion is preferably 0.9 or more.

Because of this feature, the thickness deviation of the side margin portion may be relatively small in each region, to secure a relatively large size of the capacitance forming portion. Therefore, a high-capacitance multilayer ceramic capacitor may be realized.

Figure 6:
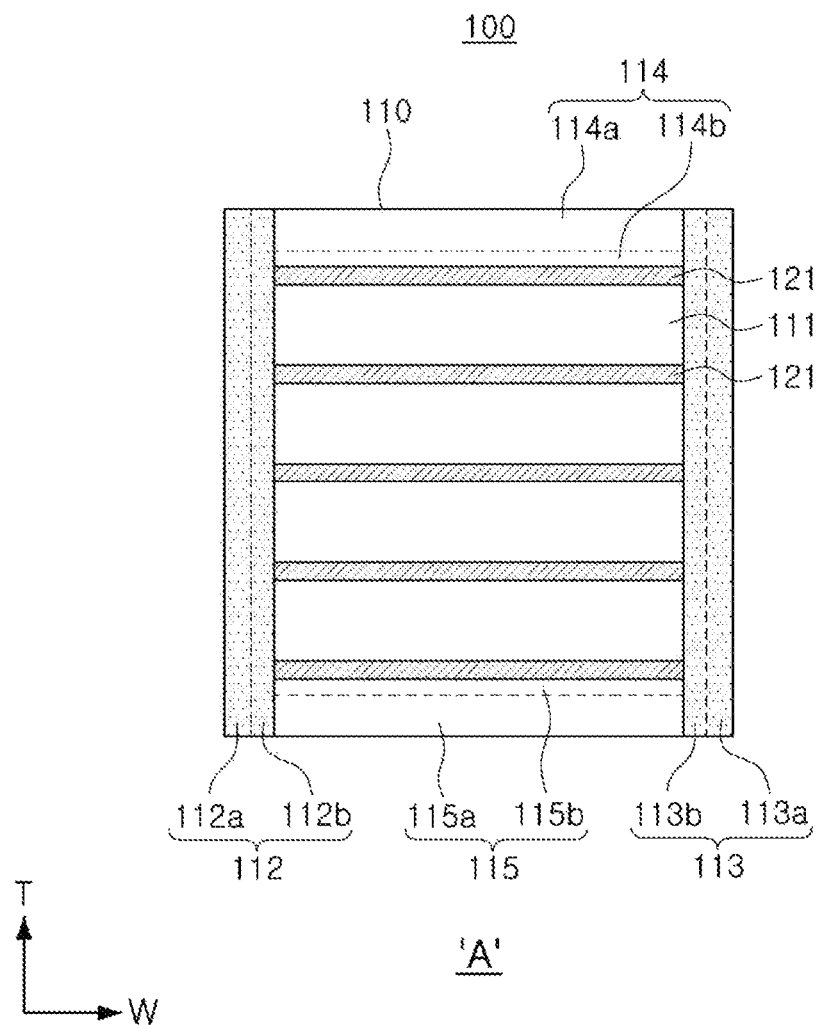
FIG. 6 is a side view of FIG. 2 according to another embodiment of the present disclosure, when viewed in direction A.

FIG. 6 is a side view of FIG. 2 according to another embodiment of the present disclosure, when viewed in direction A.

Referring to FIG. 6, in a multi-layered ceramic electronic device according to another embodiment of the present disclosure, cover portions 114 and 115 may include first regions 114a and 115a adjacent to the fifth surface 5 and the sixth surface 6 of the ceramic body 110, and second regions 114b and 115b adjacent to the internal electrodes 121 and 122. In this case, the number of pores per unit area in the second regions 114b and 115b may be less than the number of pores per unit area in the first regions 114a and 115a.

The cover portions 114 and 115 may include an upper cover portion 114 and a lower cover portion 115 formed on upper and lower surfaces of the active portion.

The upper cover portion 114 and the lower cover portion 115 may respectively include the first regions 114a and 115a adjacent to the fifth surface 5 and the sixth surface 6 of the ceramic body 110, and the second regions 114b and 115b adjacent to the first and second internal electrodes 121 and 122, respectively.

The upper cover portion 114 and the lower cover portion 115 may include two regions having different sizes of dielectric grain. The number of pores per unit area in the second regions 114b and 115b may be adjusted to be less than the number of pores per unit area in the first regions 114a and 115a, to improve the reliability for moisture resistance.

According to an embodiment of the present disclosure, a ratio of the number of pores per unit area in the second regions 114b and 115b to the number of pores per unit area in the first regions 114a and 115a may be 0.8 or less.

The ratio of the number of pores per unit area in the second regions 114b and 115b to the number of pores per unit area in the first regions 114a and 115a may be 0.8 or less, to improve the reliability for moisture resistance.

When the ratio of the number of pores per unit area in the second regions 114b and 115b to the number of pores per unit area in the first regions 114a and 115a exceeds 0.8, there may be no difference in the number of pores per unit area in the first regions 114a and 115a and the second regions 114b and 115b, to have little effect for improving the reliability for moisture resistance.

A method of adjusting the number of pores per unit area in the second regions 114b and 115b adjacent to the internal electrodes 121 and 122 to be less than the number of pores per unit area in the first regions 114a and 115a adjacent to the fifth surface 5 and the sixth surface 6 of the ceramic body 110, is not particularly limited. For example, the method may be realized by adjusting a size of a raw ceramic powder particle to be introduced in an operation of forming the first regions 114a and 115a and the second regions 114b and 115b.

For example, the method may be realized by adjusting a particle size or an average particle size of barium titanate ($BaTiO_3$) powder particle as a raw material for forming the second regions 114b and 115b adjacent to the internal electrodes 121 and 122 to be larger than a particle size or an average particle size of barium titanate ($BaTiO_3$) powder particle as a raw material for forming the first regions 114a and 115a adjacent to the fifth surface 5 and the sixth surface 6 of the ceramic body 110.

Although not particularly limited, for example, the particle size or the average particle size of barium titanate ($BaTiO_3$) powder particle as a raw material for forming the second regions 114b and 115b adjacent to the internal electrodes 121 and 122 may be about 70 nm, and the particle size or the average particle size of barium titanate (BaTiO$_3$) powder particle as a raw material for forming the first regions 114a and 115a adjacent to the fifth surface 5 and the sixth surface 6 of the ceramic body 110 may be about 40 nm.

According to an embodiment of the present disclosure, a size of the raw ceramic powder particle to be introduced in the operations of forming the first regions 114a and 115a and the second regions 114b and 115b may be controlled. Therefore, after the sintering operation, the size or the average size of the dielectric grain included in the first regions 114a and 115a may be 90 nm or more and 410 nm or less, and the size or the average size of the dielectric grain included in the second regions 114b and 115b may be 170 nm or more and 700 nm or less.

The size of the dielectric grain may be the same as the method for measuring the size of the dielectric grain included in the side margin portion described above.

In the upper and lower cover portions 114 and 115, it is characterized in that the content of magnesium (Mg) included in the second regions 114b and 115b may be larger than the content of magnesium (Mg) included in the first regions 114a and 115a.

The upper and lower cover portions 114 and 115 of the ceramic body 110 may include two regions having different compositions, and a magnesium (Mg) content included in each of the regions may be different, to improve the compactness of the upper and lower cover portions 114 and 115, and improve the moisture resistance.

The content of magnesium (Mg) of the second regions 114b and 115b of the upper and lower cover portions 114 and 115 may be greater than the content of magnesium (Mg) of the first regions 114a and 115a of the upper and lower cover portions 114 and 115. Therefore, the compactness of the second regions 114b and 115b of the upper and lower cover portions 114 and 115 may be enhanced to improve the moisture resistance.

The content of magnesium (Mg) in the second regions 114b and 115b of the upper and lower cover portions 114 and 115 may be 10 mol or more and 30 mol or less, based on 100 mol of titanium (Ti) included in the upper and lower cover portions 114 and 115.

The content of magnesium (Mg) included in the second regions 114b and 115b of the upper and lower cover portions 114 and 115 may be controlled to be 10 mol or more and 30 mol or less, based on 100 mol of titanium (Ti) included in the upper and lower cover portions 114 and 115, to improve the moisture resistance.

FIGS. 7A to 7G are cross-sectional and perspective views schematically illustrating a method of manufacturing a multilayer ceramic capacitor according to another embodiment of the present disclosure.

According to another embodiment of the present disclosure, a method of manufacturing a multilayer ceramic capacitor, includes: preparing a first ceramic green sheet having a plurality of first internal electrode patterns formed at predetermined intervals, and a second ceramic green sheet having a plurality of second internal electrode patterns formed at predetermined intervals; forming a ceramic green sheet stacked body by stacking the first ceramic green sheet and the second ceramic green sheet to alternately arrange the first internal electrode patterns and the second internal electrode patterns in a thickness direction; cutting the ceramic green sheet stacked body to have ends of the first internal electrode patterns and the second internal electrode patterns having exposed side surfaces in a width direction; forming a first side margin portion and a second side margin portion on the exposed side surfaces of the ends of the first internal electrode patterns and the second internal electrode patterns, to prepare a cut stacked body; and sintering the cut stacked body to prepare a ceramic body comprising a dielectric layer and first and second internal electrodes. The ceramic body comprises an active portion comprising the plurality of internal electrodes arranged to oppose each other with the dielectric layer interposed therebetween to form capacitance, and cover portions formed on upper and lower surfaces of the active portion, and the first and second side margin portions are respectively divided into a first region adjacent to an outer side surface of each of the side margin portions, and a second region adjacent to the exposed internal electrodes. The number of pores per unit area in the second region is less than the number of pores per unit area in the first region.

Hereinafter, a method of manufacturing a multilayer ceramic capacitor according to another embodiment of the present disclosure will be described.

Figure 7A:
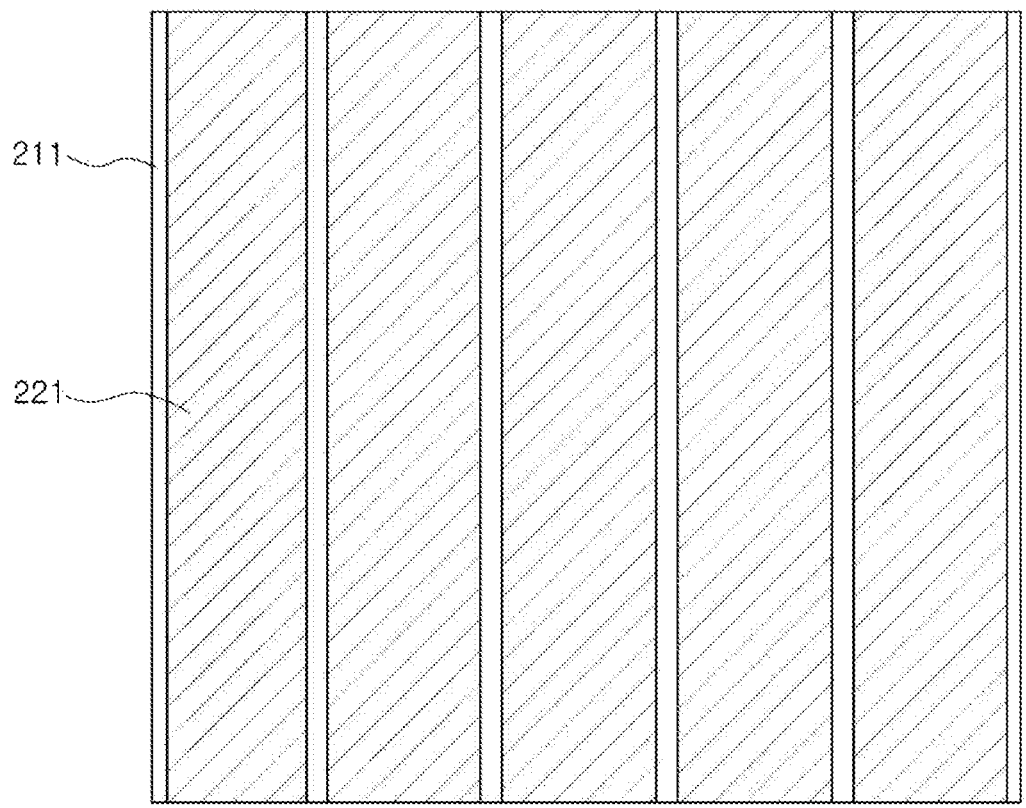
FIGS. 7A to 7G are cross-sectional and perspective views schematically illustrating a method of manufacturing a multilayer ceramic capacitor according to another embodiment of the present disclosure.

As illustrated in FIG. 7A, a plurality of stripe-shaped first internal electrode patterns 221 may be formed on a ceramic green sheet 211 at predetermined intervals. The plurality of stripe-type first internal electrode patterns 221 may be formed in parallel with each other.

The ceramic green sheet 211 may be formed of a ceramic paste including a ceramic powder particle, an organic solvent, and an organic binder.

The ceramic powder particle may be a material having a high dielectric constant, but is not limited thereto. Examples thereof may include a barium titanate (BaTiO$_3$)-based material, a lead composite perovskite-based material, a strontium titanate (SrTiO$_3$)-based material, or the like, and is preferably a barium titanate (BaTiO$_3$)-based powder particle may be used. When the ceramic green sheet 211 is sintered, a dielectric layer 111 constituting a ceramic body 110 may be formed.

The stripe-shaped first internal electrode pattern 221 may be formed by an internal electrode paste containing a conductive metal. The conductive metal may be nickel (Ni), copper (Cu), palladium (Pd), or alloys thereof, but is not limited thereto.

The method of forming the stripe-shaped first internal electrode patterns 221 on the ceramic green sheet 211 is not particularly limited, but may be formed by a printing method such as a screen printing method or a gravure printing method.

Also, although not illustrated, a plurality of stripe-shaped second internal electrode patterns 222 may be formed on the other ceramic green sheet 211 at predetermined intervals.

Hereinafter, a ceramic green sheet on which the first internal electrode patterns 221 are formed may be referred to as a first ceramic green sheet, and a ceramic green sheet on which the second internal electrode patterns 222 are formed may be referred to as a second ceramic green sheet.

Figure 7B:
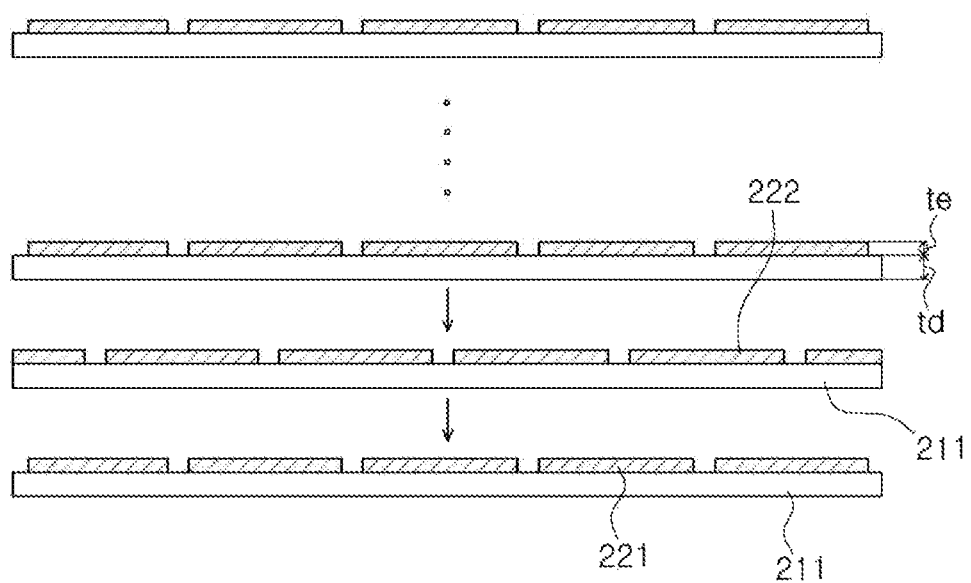

Next, as illustrated in FIG. 7B, the first and second ceramic green sheets may be alternately stacked to alternately stack the stripe-shaped first internal electrode patterns 221 and stripe-shaped second internal electrode patterns 222.

The stripe-type first internal electrode pattern 221 may become a first internal electrode 121, and the stripe-type second internal electrode pattern 222 may become a second internal electrode 122.

According to another embodiment of the present disclosure, a thickness (td) of each of the first and second ceramic green sheets may be 0.6 µm or less, and a thickness (te) of each of the first and second internal electrode patterns may be 0.5 µm or less.

Since the present disclosure may be characterized by an ultra-small, high-capacitance multilayer ceramic capacitor having a dielectric layer having a thickness of 0.4 μm or less and a thickness of an internal electrode of 0.4 μm or less, the thickness (td) of each of the first and second ceramic green sheets may be 0.6 μm or less, and the thickness (te) of each of the first and second internal electrode patterns may be 0.5 μm or less.

Figure 7C:
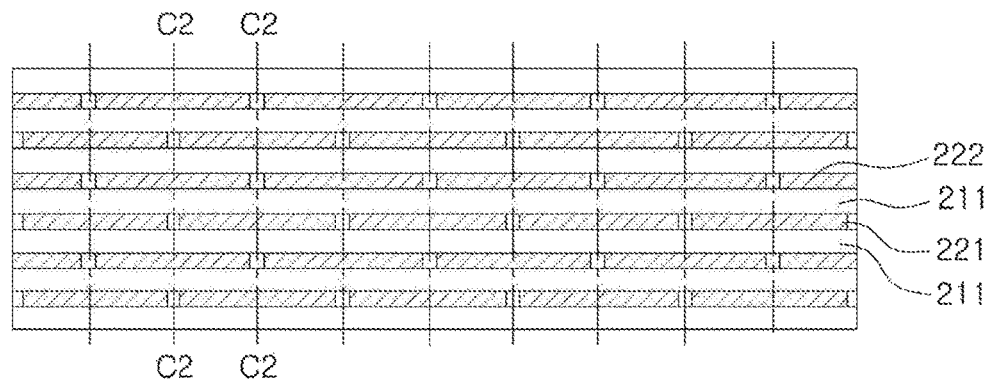
Figure 7D:
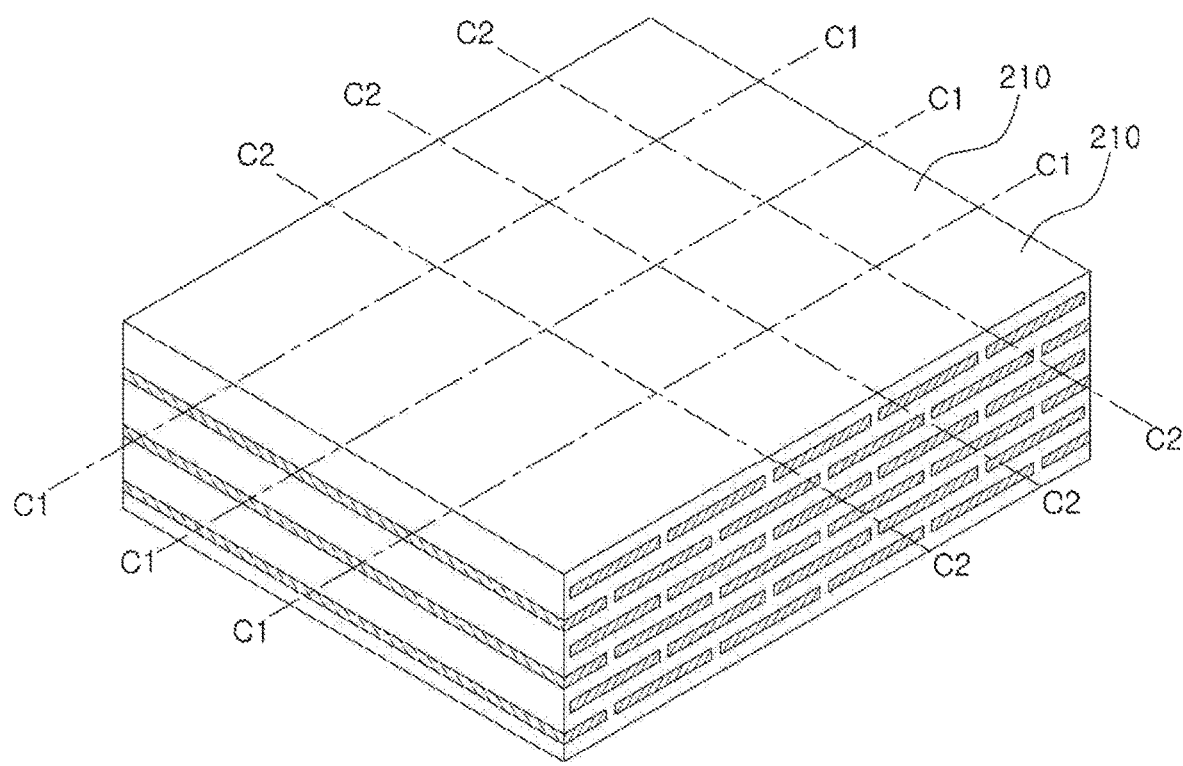

FIG. 7C is a cross-sectional view illustrating a ceramic green sheet stacked body 220 in which first and second ceramic green sheets are stacked according to an embodiment of the present disclosure, and FIG. 7D is a perspective view illustrating a ceramic green sheet stacked body 220 in which first and second ceramic green sheets are stacked.

Referring to FIGS. 7C and 7D, a first ceramic green sheet on which a plurality of parallel stripe-type first internal electrode patterns 221 are printed and a second ceramic green sheet on which a plurality of parallel stripe-type second internal electrode patterns 222 are printed may be stacked alternately with each other.

In particular, they may be stacked to overlap periods between a central portion of the stripe-shaped first internal electrode pattern 221 printed on the first ceramic green sheet and the stripe-shaped second internal electrode patterns 222 printed on the second ceramic green sheet each other.

Next, as illustrated in FIG. 7D, the ceramic green sheet stacked body 220 may be cut to cross the plurality of stripe-shaped first internal electrode patterns 221 and the plurality of the stripe-shaped second internal electrode patterns 222. For example, the ceramic green sheet stacked body 210 may become a stacked body 210 cut along cutting lines C1-C1 and C2-C2, orthogonal to each other.

In particular, the stripe-shaped first internal electrode patterns 221 and the stripe-shaped second internal electrode patterns 222 may be divided into a plurality of internal electrodes that are cut in a longitudinal direction and have a constant width. In this case, the stacked ceramic green sheet may be also cut together with the internal electrode pattern. Therefore, the dielectric layer may be formed to have the same width as a width of the internal electrode.

It may also be cut in conformity with individual ceramic body sizes along cutting line C2-C2. For example, before forming the first side margin portion and the second side margin portion, the stacked body 210 may be formed in plural by cutting a rod-shaped stacked body into individual ceramic body sizes along cutting line C2-C2.

For example, the rod-shaped stacked body may be cut to be divided by cutting lines having an overlapped and predetermined interval formed between the central portion of the first internal electrode and the second internal electrode. Therefore, one end of each of the first internal electrode and the second internal electrode may be alternately exposed from the cut surface.

Thereafter, the first side margin portion and the second side margin portion may be respectively formed on the first and second side surfaces of the stacked body 210.

Figure 7E:
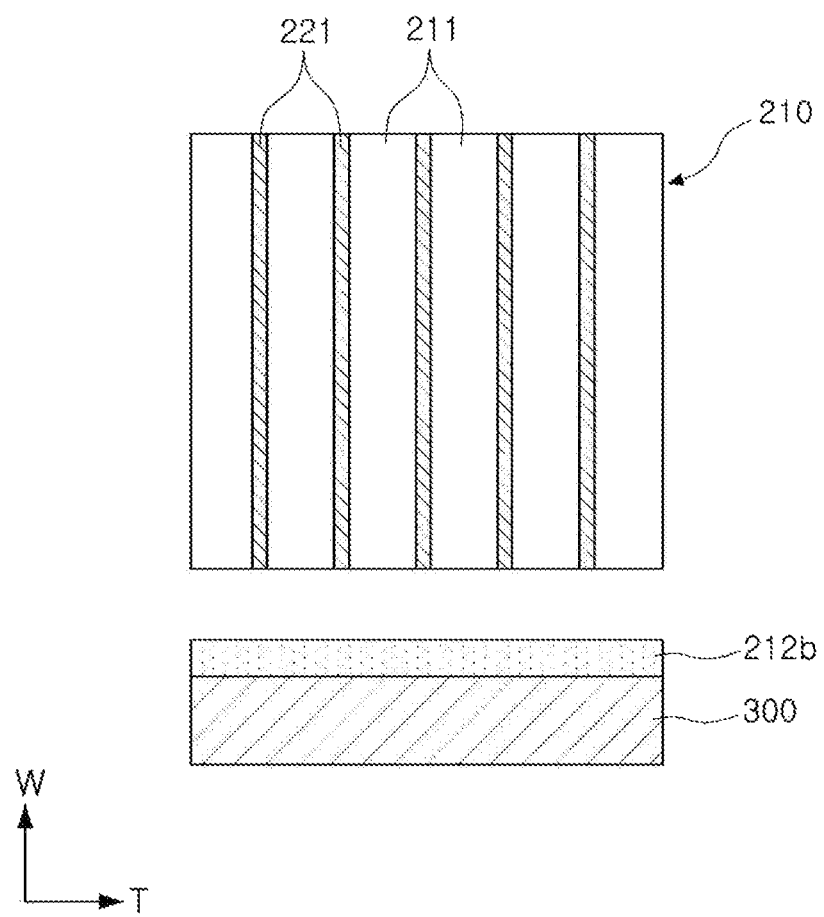

Next, as illustrated in FIG. 7E, a second region 212b of the first side margin portion may be formed on a first side surface of the stacked body 210.

In particular, in a method of forming the second region 212b of the first side margin portion, a ceramic green sheet for a side surface may be disposed on a punching elastic material 300 of a rubber material.

Next, the stacked body 210 may be rotated 90 degrees such that the first side surface of the stacked body 210 faces the ceramic green sheet for the side surface, and then the stacked body 210 may be pressed tightly against the ceramic green sheet for the side surface.

When the stacked body 210 is pressed against the ceramic green sheet for the side surface to transfer the ceramic green sheet for the side surface to the stacked body 210, due to the punching elastic material 300 of the rubber material, the ceramic green sheet for the side surface may be formed up to a side edge portion of the stacked body 210, and the remaining portion may be cut.

Figure 7F:
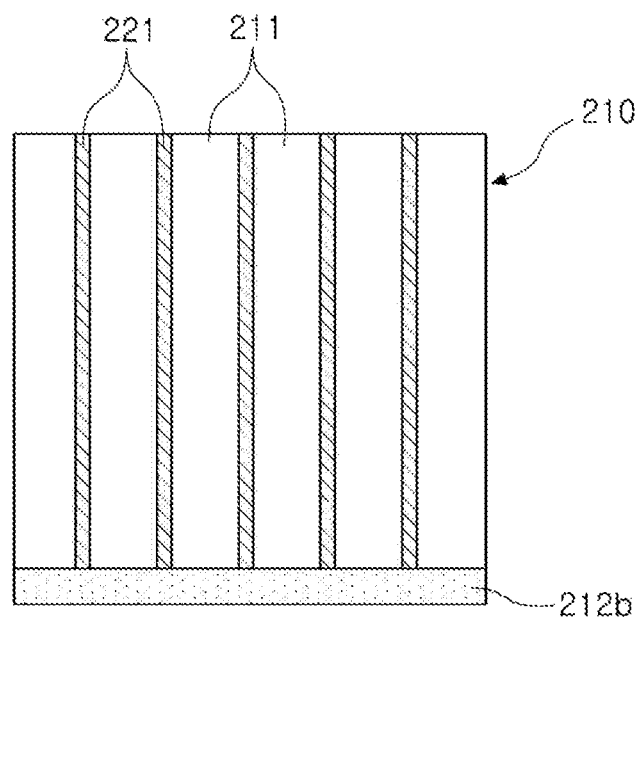

Therefore, as illustrated in FIG. 7F, the second region 212b of the first side margin portion may be formed on the first side surface of the stacked body 210.

Thereafter, the stacked body 210 may be rotated to form a second region of the second side margin portion on the second side surface of the stacked body 210.

Figure 7G:
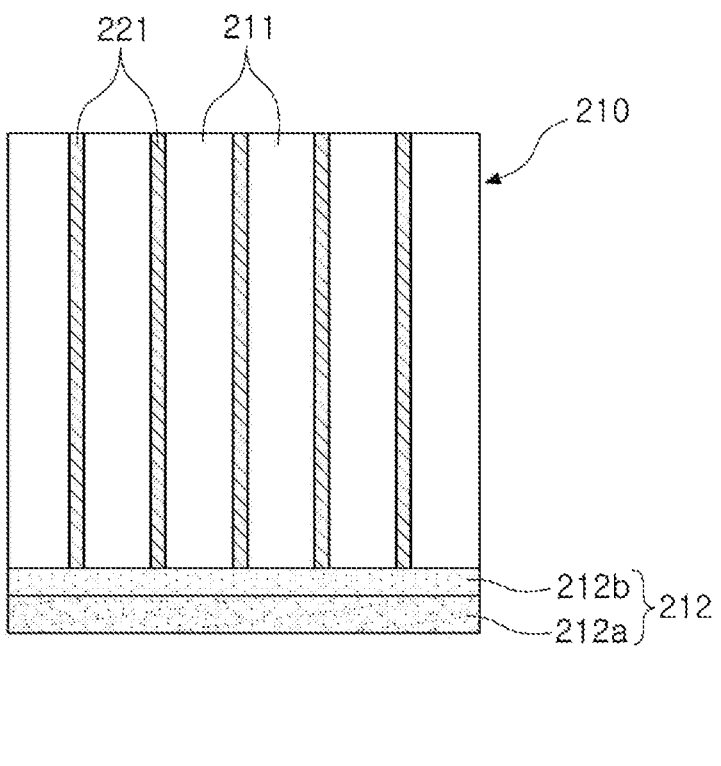

Next, as illustrated in FIG. 7G, a first region 212a of the first side margin portion may be formed on the first side surface of the stacked body 210.

A method of forming the first region 212a of the first side margin portion on the first side surface of the stacked body 210 may be identical to the method of forming the second region 212b of the first side margin portion on the first side surface of the stacked body 210, as described above.

Next, a stacked body having first and second side margin portions on both side surfaces of the stacked body 210 may be calcined and sintered, to form a ceramic body including the dielectric layer and the first and second internal electrodes.

Hereinafter, external electrodes may be respectively formed on the third side surface of the ceramic body from which the first internal electrode is exposed and on the fourth side surface of the ceramic body from which the second internal electrode is exposed.

According to another embodiment of the present disclosure, the ceramic green sheet for the side surface may be relatively thin, and deviation in thickness may be relatively small, to secure a relatively large size of the capacitance forming portion.

In particular, since the average thickness of the first and second side margin portions 112 and 113, after the sintering operation, may be 2 μm or more and 15 μm or less, the deviation in thickness of the first and second side margin portions 112 and 113 may be relatively small.

As a result, a high-capacitance multilayer ceramic capacitor may be realized.

The description of the same features as those of the above-described embodiment of the present disclosure will be omitted here to avoid redundancy.

Hereinafter, the present disclosure will be described in more detail with reference to Experimental Examples, such Experimental Examples may be to provide the specific understanding of the present disclosure, and the present disclosure is not limited by Experimental Examples.

Experimental Examples

According to an embodiment of the present disclosure, Comparative Examples in which a conventional side margin portion was formed, and Inventive Examples in which a side margin portion including first and second regions having different sizes in dielectric grain was formed were provided, respectively.

A ceramic green sheet stacked body was formed by attaching a ceramic green sheet for a side surface, as in the above Comparative Examples and Examples, to an electrode exposed portion of a green chip from which internal electrodes were exposed in a width direction, respectively, to form a side margin portion.

A ceramic green sheet for a side surface was attached to both side surfaces of the ceramic green sheet stacked body, by applying a constant temperature and pressure thereto under a condition of minimizing deformation of the chip, to prepare a multilayer ceramic capacitor green chip having a size of 0603 (width×length×height: 0.6 mm×0.3 mm×0.3 mm).

The multilayer ceramic capacitor specimens thus prepared was subjected to a calcination treatment under a nitrogen atmosphere at a temperature of 400° C. or less, was sintered under the conditions of a sintering temperature of 1200° C. or less and a $H_2$ concentration of 0.5% or less, and was confirmed with respect to electric characteristics such as appearance defects, insulation resistance, moisture resistance, and the like.

Figure 8:
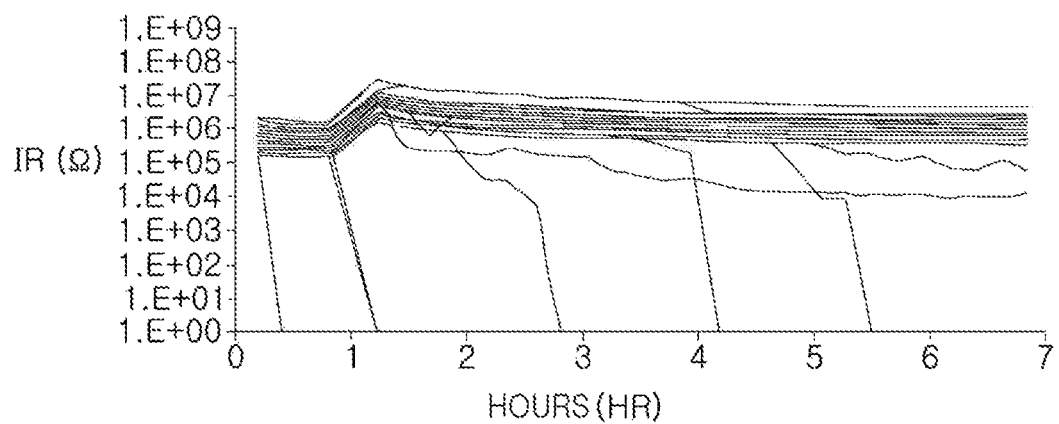
FIG. 8 is a graph comparing results of reliability test for moisture resistance according to Inventive and Comparative Examples of the present disclosure.
Figure 8:
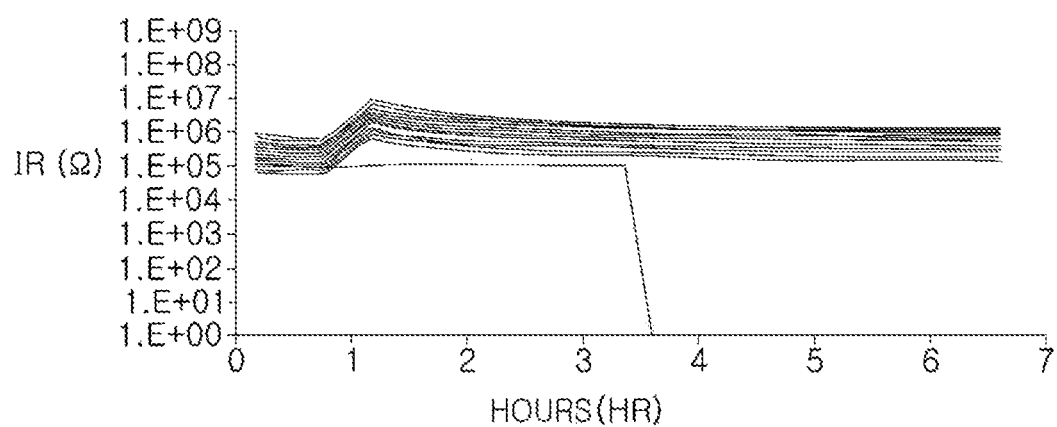

FIG. 8 is a graph comparing results of reliability test for moisture resistance according to Inventive and Comparative Examples of the present disclosure.

Portion (a) of FIG. 8 illustrates Comparative Examples using conventional multilayer ceramic capacitor structures, in which there were no difference in the number of pores included in a side margin portion, and portion (b) of FIG. 8 illustrates Inventive Examples in which, in the side margin portions 112 and 113, the number of pores per unit area in the second regions 112b and 113b was less than the number of pores per unit area in the first regions 112a and 113a.

It can be seen that the Comparative Examples had a problem of the reliability in moisture resistance, and in Inventive Examples had excellent reliability in moisture resistance.

According to an embodiment of the present disclosure, the first and second side margin portions may be divided into the first region adjacent to the outer side surface of each of the side margin portions, and the second region adjacent to the internal electrodes exposed on the first and second surfaces of the ceramic body. The number of pores per unit area in the second region is less than the number of pores per unit area in the first region, thereby improving the reliability for moisture resistance.

In addition, since the size of the dielectric grain included in the first region may be controlled to be smaller than the size of the dielectric grain included in the second region, a high-toughness gap sheet may be formed, and a mounting crack may be improved.

Further, the content of magnesium (Mg) included in the region of the side margin portion adjacent to the side surface of the ceramic body in the width direction may be adjusted to improve the reliability in moisture resistance.

The cover portion may include the first region adjacent to the external surface of the ceramic body and the second region adjacent to the internal electrode disposed outermost among the plurality of internal electrodes, and the number of pores and the content of magnesium (Mg) included in the first region and the second region may be adjusted to improve the reliability in moisture resistance.

While example embodiments have been illustrated and described above, it will be apparent to those skilled in the art that modifications and deviations could be made without departing from the scope of the present disclosure as defined by the appended claims.

What is claimed is:

1. A multilayer ceramic capacitor comprising:
    a ceramic body including a dielectric layer, and including
        a first surface and a second surface opposing each other,
        a third surface and a fourth surface connected to the first surface and the second surface and opposing each other, and a fifth surface and a sixth surface connected to the first surface to the fourth surface and opposing each other;
    a plurality of internal electrodes disposed in the ceramic body, exposed from the first and second surfaces, and having one ends exposed from the third surface or the fourth surface; and
    a first side margin portion and a second side margin portion respectively arranged on end portions of the internal electrodes exposed from the first and second surfaces,
    wherein the ceramic body comprises an active portion comprising the plurality of internal electrodes arranged to oppose each other with the dielectric layer interposed therebetween to form capacitance, and cover portions respectively disposed on upper and lower surfaces of the active portion,
    the first and second side margin portions respectively include a first region adjacent to an outer side surface of each of the side margin portions, and a second region adjacent to the internal electrodes exposed from the first and second surfaces, wherein the number of pores per unit area in the second region is less than the number of pores per unit area in the first region,
    a content of magnesium (Mg) included in the second region is greater than a content of magnesium (Mg) included in the first region, and
    an average size of dielectric grains included in the first region is smaller than an average size of dielectric grains included in the second region.

2. The multilayer ceramic capacitor according to claim 1, wherein a ratio of the number of pores per unit area in the second region to the number of pores per unit area in the first region is 0.8 or less.

3. The multilayer ceramic capacitor according to claim 1, wherein the cover portions respectively include a first region adjacent to the fifth and sixth surfaces of the ceramic body, and a second region adjacent to the active portion, wherein the number of pores per unit area in the second region of each of the cover portions is less than the number of pores per unit area in the first region of each of the cover portions.

4. The multilayer ceramic capacitor according to claim 3, wherein a ratio of the number of pores per unit area in the second region of each of the cover portions to the number of pores per unit area in the first region of each of the cover portions is 0.8 or less.

5. The multilayer ceramic capacitor according to claim 3, wherein a content of magnesium (Mg) included in the second region of each of the cover portions is greater than a content of magnesium (Mg) included in the first region of each of the cover portions.

6. The multilayer ceramic capacitor according to claim 1, wherein a thickness of the dielectric layer is 0.4 μm or less, and a thickness of each of the internal electrodes is 0.4 μm or less.

7. The multilayer ceramic capacitor according to claim 1, wherein a thickness of the first region is 12 μm or less, and a thickness of the second region is 3 μm or less.

8. A multilayer ceramic capacitor comprising:
    a ceramic body including a dielectric layer, and including
        a first surface and a second surface opposing each other,
        a third surface and a fourth surface connected to the first surface and the second surface and opposing each other, and a fifth surface and a sixth surface connected to the first surface to the fourth surface and opposing each other;

a plurality of internal electrodes disposed in the ceramic body, exposed from the first and second surfaces, and having one ends exposed from the third surface or the fourth surface; and a first side margin portion and a second side margin portion respectively arranged on end portions of the internal electrodes exposed from the first and second surfaces, wherein the ceramic body comprises an active portion comprising the plurality of internal electrodes arranged to oppose each other with the dielectric layer interposed therebetween to form capacitance, and cover portions respectively disposed on upper and lower surfaces of the active portion, and the cover portions respectively include a first region adjacent to the fifth and sixth surfaces of the ceramic body, and a second region adjacent to the active portion, wherein the number of pores per unit area in the second region of each of the cover portions is less than the number of pores per unit area in the first region of each of the cover portions.

* * * * *